United States Patent
Oesterle et al.

(10) Patent No.: US 6,626,627 B2
(45) Date of Patent: *Sep. 30, 2003

(54) SCREW WITH TAMPER-PROOF HEAD

(75) Inventors: Helmut Oesterle, Feldkirch (AT); Norbert Koeppel, Au (CH); Felix Scheiwiller, Diepoldsau (CH); Peter Kouwenhoven, Widnau (CH)

(73) Assignee: SFS Industrie Holding AG, Heerbrugg (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 57 days.

(21) Appl. No.: 09/381,723

(22) PCT Filed: Feb. 16, 1998

(86) PCT No.: PCT/EP98/00872

§ 371 (c)(1),
(2), (4) Date: Feb. 9, 2000

(87) PCT Pub. No.: WO98/42989

PCT Pub. Date: Oct. 1, 1998

(65) Prior Publication Data

US 2001/0028835 A1 Oct. 11, 2001

(30) Foreign Application Priority Data

Mar. 26, 1997 (DE) .......................... 197 12 784

(51) Int. Cl.⁷ ................................ F16B 23/00
(52) U.S. Cl. ...................... 411/410; 411/910
(58) Field of Search ................ 411/402, 399, 411/346, 910, 387.1, 410, 919

(56) References Cited

U.S. PATENT DOCUMENTS

| | | | | | |
|---|---|---|---|---|---|
| 452,640 | A | * | 5/1891 | Gerry | 411/399 |
| 755,804 | A | * | 3/1904 | Smith | 411/402 |
| 1,243,799 | A | * | 10/1917 | Bissell | 411/910 |
| 1,396,455 | A | * | 11/1921 | Moore | 411/399 |
| 1,715,032 | A | * | 5/1929 | Hoegger | 411/402 |
| 2,103,944 | A | * | 12/1937 | Gullborg | 411/402 |
| 2,955,690 | A | * | 10/1960 | Bedford | |
| 3,060,785 | A | * | 10/1962 | Corlett | 411/910 |
| 4,189,976 | A | | 2/1980 | Becker | |
| 4,394,096 | A | * | 7/1983 | Stevens | 411/910 |
| 5,551,818 | A | | 9/1996 | Koppel | |
| 5,556,080 | A | * | 9/1996 | Vise | 411/399 |

FOREIGN PATENT DOCUMENTS

| | | | |
|---|---|---|---|
| DE | 1866745 | | 5/1963 |
| DE | 2456668 | | 6/1975 |
| DE | 3043429 | | 1/1988 |
| DE | 4239333 A1 | | 5/1994 |
| FR | 1309208 | | 12/1962 |
| GB | 2067699 | * | 7/1981 ................. 411/910 |
| GB | 2189858 | | 11/1987 |

OTHER PUBLICATIONS

Mechanical Fasteners, DIN 918, Sep. 1979, pp. 185–202.

* cited by examiner

*Primary Examiner*—Flemming Saether
(74) *Attorney, Agent, or Firm*—Volpe and Koenig, P.C.

(57) ABSTRACT

A screw (1) is provided with a shank (3), a head (2) and a boring part (5). The shank (3) is provided with a thread (4). The head (2) has a shoulder (6) disposed at an axial distance (B) from the bearing face (12), while a portion (7) adjoining the shoulder on the shank side is provided with a tool drive (8). The head (2) of the screw can therefore be seized in axially secure manner by a tool in the region of the shoulder (6), and this tool can then simultaneously transmit the necessary torque in the region of the tool drive (8) as well.

16 Claims, 2 Drawing Sheets

SCREW WITH TAMPER-PROOF HEAD

BACKGROUND

The invention relates to a screw comprising a shank provided with a thread at least on part of its length, and a head provided with a tool drive, wherein at least one shoulder disposed at an axial distance from a bearing face is formed on the head of the screw, and this shoulder extends in at least portions radially beyond a portion adjoining the shoulder on the shank side.

Extremely diverse requirements apply to screws with a head and a tool drive. In addition to an appropriately esthetic appearance specifically for use in a visible area in building construction or apparatus construction or in the automobile industry, the main considerations are secure retention and guidance of the screw while it is being driven in. Another common requirement is that appropriate safety precautions be taken to ensure that the screw cannot be easily loosened or completely detached by tools of any kind.

SUMMARY

The object of the present invention provides a screw of the type cited in the introduction, which can be securely immobilized in axial direction in the region of the head and in which a tool therefore remains reliably engaged even if the axial length of a tool drive is short.

According to the invention, it is proposed for this purpose that a portion of the head adjoining the shoulder on the shank side is provided as a tool drive formed as an external drive.

By these features according to the invention, axially secure retention of the head of the screw in an appropriate tool is therefore possible in each case, since a shoulder disposed at a distance from the bearing face of the screw head is provided. Thereby the possibilities are created of using a tool which can engage on the underside of the screw head or the shoulder provided according to the invention, in such a way that this engagement can be maintained until the screw has been finally tightened. Accordingly, even after the screw has been finally tightened, the shoulder provided according to the invention is disposed at an axial distance from the bearing face of the head. Whether the tool drive is now disposed on the portion of the head disposed under the shoulder, on the shoulder itself or even in the region above the shoulder relative to the shank of the screw is of secondary importance. Since the head as seen in axial direction of the screw can be secured in an appropriate tool by the projecting shoulder, a special axial length of the tool drive is also not needed, since the tool itself also cannot be displaced axially relative to the screw. Until the screw has been finally driven in, therefore, or in other words has been finally set, the tool and screw form a kind of unit, since the screw can be firmly clamped in the region of the shoulder on the head, in such a way that engagement of the tool with a corresponding tool drive of the screw takes place simultaneously with clamping of the head.

Despite the shoulder, which can perhaps be regarded as an additional structural configuration of the head, it is possible to provide the screw with a head which is relatively low when viewed in and axial direction and which can be formed with an esthetic appearance. Since the possibility of a tool drive with short axial length exists in such a structure, such a screw also qualifies as a special safety screw, since loosening with other types of tools of any kind is not possible.

Precisely in a configuration in which the tool drive is formed on a portion of the head of the screw adjacent to the shank and in which the portion of the head remote from the shank of the screw is designed as a shoulder, and this shoulder extends radially beyond the portion of the head with the tool drive, there are achieved additional advantages with respect to head height and safety against unauthorized improper turning of the screw. By means of such an expedient, not only can the head be kept very low, but also the tool drive on the portion disposed under the shoulder has only a very short axial length, and so, after the screw has been finally set, a standard socket wrench can never be inserted under the shoulder for the purpose of being able to establish engagement with the portion equipped with the tool drive. In such a configuration, the esthetic appearance of the screw head merits particular mention, since only by very close scrutiny can it be seen that an engagable portion with a tool drive is present under the shoulder, which is always externally visible. In this way the shoulder can even form the uppermost termination of the head of the screw and thus be given a completely smooth configuration without tool drive.

In another alternative embodiment it is provided that a portion adjoining the shoulder on the shank side adjoins a disk-shaped part forming the bearing face of the head. Thus a head is formed which for practical purposes has, between two portions of larger diameter or of larger radial dimensions, an annular recess, which constitutes the portion adjoining the shoulder. Thereby the head has been provided with a larger face for bearing on the workpiece if such is needed, although in this case the shoulder disposed at a distance from the bearing face serves the purpose of being seized by an appropriate tool. The tool in turn can then engage with the underside of the shoulder from behind, since the portion of smaller diameter or smaller outside dimensions directly adjoins the shoulder.

In a further embodiment, an additional tool drive is formed on the side of the shoulder remote from the shank. This indeed provides easier accessibility for subsequent loosening of a screw that has been set, but even here a tool drive with relatively short axial length can be used and thereby correspondingly increased safety achieved once again. In tool drives of relatively short axial length, it is almost impossible to loosen a firmly tightened screw with any kind of socket wrench or open-ended wrench, unless exact and fixed alignment relative to the axis of the screw can be achieved.

In this connection, an axially protruding portion with an external tool drive can be formed on the side of the shoulder remote from the shank. The possibility therefore also exists of providing a corresponding internal tool drive directly at the upper side of the shoulder. Since it is possible in principle to form an internal tool drive with only short axial depth, additional safety precautions against loosening can also be built in here. In this connection, the possibilities are not limited merely to a hexagon socket or special internal drives with regular contours; instead, it is entirely possible to provide slots or ridges having very special shape, in order to permit exact matching to tools of the manufacturer in question.

Within the scope of the invention, it is also conceivable to provide, instead of a portion adjoining the shoulder in one piece on the side of the shank of the screw, a different alternative embodiment. For this purpose it is proposed that, in order to create an axial distance between the shoulder and the bearing face on a workpiece, a washer smaller in diameter than the shoulder be provided and be insertable noncaptively or captively under the shoulder. Thus it is not always necessary for a portion adjoining the shoulder in one piece to be present, but instead this axial distance can also be achieved precisely by a washer. In fact, to ensure that secure retention of the screw head can be maintained during the driving-in process until the screw has been finally set, it is merely necessary to create an appropriate axial distance under the shoulder. The tool, while actually holding the screw in appropriate manner in the region of the shoulder, should then not come into contact with the workpiece while tightening the screw underneath the shoulder.

In this connection, it is also possible to construct an additional disk-like part, which adjoins a corresponding portion under the shoulder, in one piece with the head of the screw or to form it as a washer.

As a rule, it will be sufficient if at least one of the portions of the head of the screw or just the shoulder on the head of the screw is provided with a tool drive. It is also conceivable, however, for a plurality of portions of the head disposed successively and if appropriate spaced apart in the axial direction of the screw to be provided with a tool drive. In this connection it is possible for these multiple portions also to have the most diverse forms of tool drives.

Precisely for forming a plane terminating face on the head of the screw and thus for giving the optical impression of appropriate safety against being loosened by turning, it is advantageous for the shoulder viewed in axial direction of the screw completely to mask the shank-side portion containing the tool drive, so that the tool drive is disposed completely underneath and inside the outside boundary of the head.

In a further proposal, the shoulder and one or more additional, disk-like parts have the same or different size and/or outside contour. Thereby not only are different practical alternatives of such a screw conceivable, but also there are also derived therefrom the most diverse combinations of tool drives, which cannot be engaged with a standard tool. By virtue of the expedients of the invention, therefore, the most diverse alternative forms of screw heads are conceivable, in which, however, it must always be guaranteed that the screw is axially secured throughout the entire driving-in process and thus also held in axially aligned condition, and that the tool drive remains constantly inserted in exactly aligned orientation with the tool during the driving-in process.

In one very simple alternative, an external tool drive is formed on the shoulder itself. However, the safety features for an external drive on the shoulder itself must meet much stricter requirements than when a tool drive is disposed on the portion provided under the shoulder.

Several options are possible for the tool drive, the simplest alternative being that in which the tool drive has a polygonal or noncircular cross section. In this connection, it would also be conceivable that, for a self-forming thread on the shank and a corresponding trilobular cross section of the shank, for example, the tool drive also has trilobular form at the corresponding portion. In the scope of the invention it is also conceivable that a tool drive in the form of recesses and/or raised structures and/or symmetric or asymmetric peripheral contour will be provided.

By means of the expedients according to the invention, the head shape of a screw can be configured very individually, while nevertheless assuring appropriate retention during the actual driving-in process. Thus it is possible for the shoulder to have cylindrical, frustoconical or spherical-sector form. In this connection, it is advantageous for transitions or edges, especially those provided on the exposed end region of the head, to be rounded. The functions of engineering design and of esthetic surface can therefore be optimally coordinated.

In order to achieve safety against loosening of the screw in a very special way, it is proposed that the portion provided with the tool drive have axial length equal to or shorter than the shoulder forming part of the head. For the portion equipped with the tool drive, therefore, only a short axial length is necessary, and so the undercut remaining under the shoulder after final setting of the screw is hardly perceptible and already cannot be reached at all with a commercial tool.

Within the scope of the invention, however, it is also possible that the portion provided with the tool drive has an axial length the same or longer than the shoulder forming part of the head. Such aversion is applicable, particularly for aesthetic reasons for various cases in which a higher head is desired.

In a special configuration of the screw, it is provided that a boring part is formed on, attached to or inserted in the end of the shank remote from the head. Precisely because of the special configuration of the head and the possibility of retention and exact axial alignment, the features are usable even in self-boring and self-thread-cutting screws. Although only a short axial length is available for the tool drive, the torque necessary for a boring or thread-forming process can be transmitted without problems of any kind.

BRIEF DESCRIPTION OF THE DRAWINGS

Further features and special advantages according to the invention are explained in more detail in the description hereinafter with reference to the drawings, wherein.

DETAILED DESCRIPTION OF THE PREFERRED EMBODIMENTS

Figure 1:
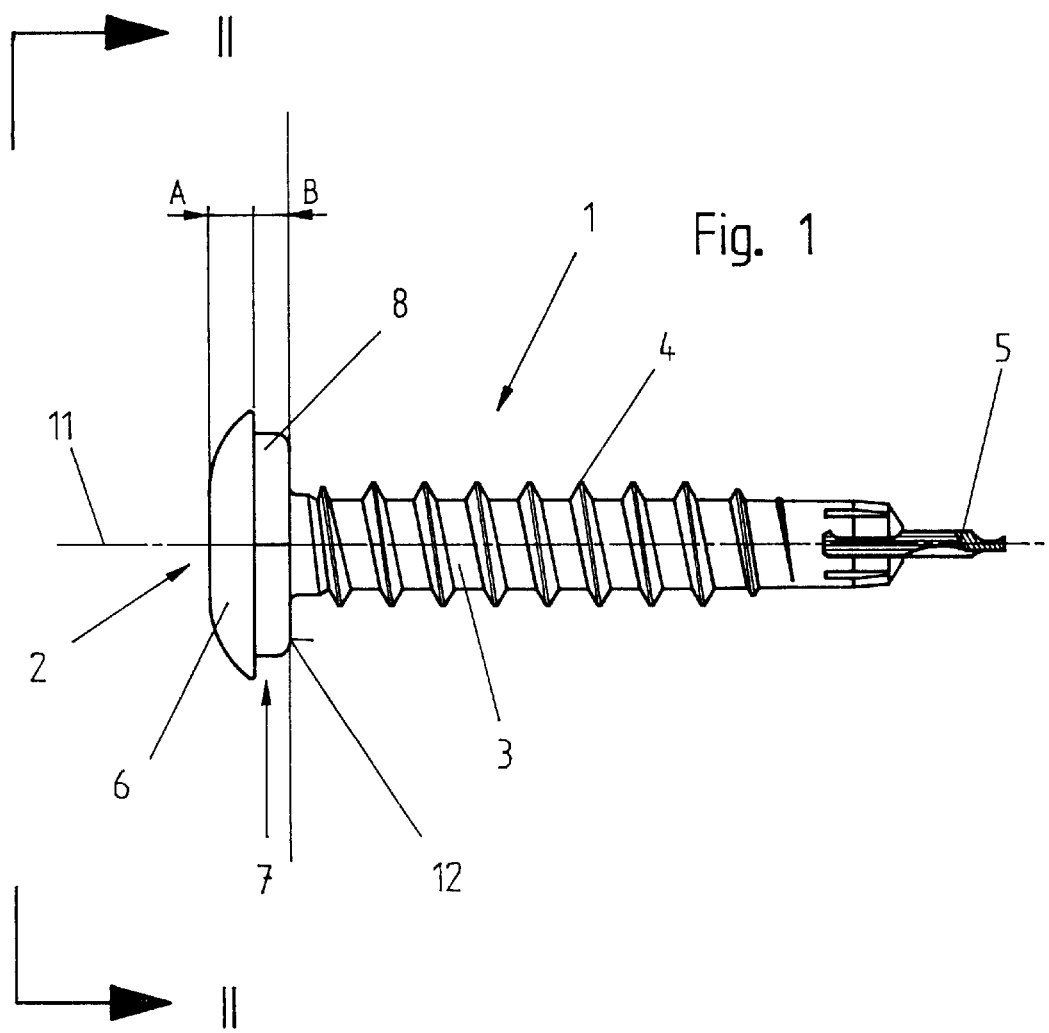
FIG. 1 shows a view of a screw.
Figure 2:
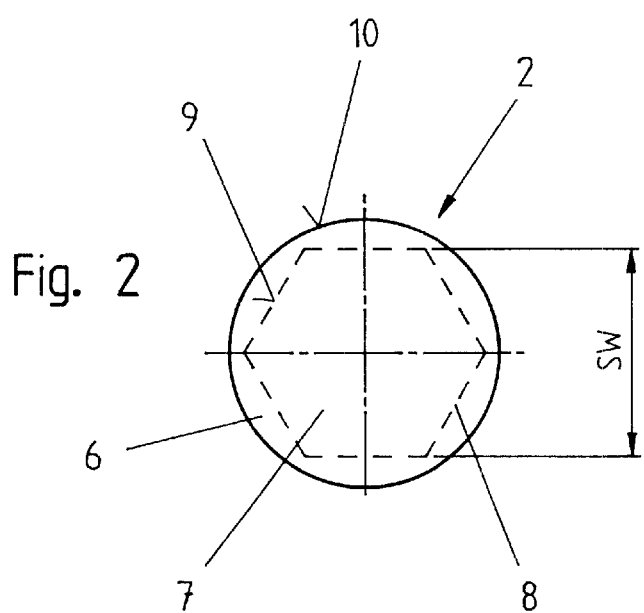
FIG. 2 shows a view of the screw in direction II—II in FIG. 1.

Screw 1 as illustrated in FIGS. 1 and 2 and in the further figures of the drawing comprises substantially a head 2 and a shank 3. Shank 3 is provided at least on part of its length with a thread 4. In such a screw there can be additionally inserted a boring part 5, which in the illustrated example is constructed as a boring plate and is inserted in an appropriate slit at the free end of the shank. Obviously any kind of boring part formed on, attached to or inserted in the free end of the shank can be provided. Naturally thread 4 is of self-boring type when a boring part 5 is mounted. However, the features according to the invention are also applicable to any type of screws which have a shank 3 with a thread 4, regardless of whether a boring part 5 is present, whether thread 4 is self-forming or whether the screw is being driven into an already threaded hole.

The head of the screw is equipped with a tool drive 8. On head 2 of screw 1 there is formed a shoulder 6 disposed at an axial distance B from bearing face 12. The shoulder extends at least in portions beyond portion 7, which adjoins shoulder 6 on the shank side. In this embodiment tool drive 8 is disposed on portion 7. The portion of head 2 remote from shank 3 of screw 1 is formed by shoulder 6, this shoulder 6 extending radially beyond portion 7 with tool drive 8. Precisely in such an embodiment it is provided that shoulder 6 viewed in axial direction of the screw completely masks shank-side portion 7 with tool drive 8. Tool drive 8 with its boundary 9 is therefore disposed completely inside boundary 10 of shoulder 6 and is completely masked thereunder. In the embodiment according to FIGS. 1 and 2, tool drive 8 is polygonal, and in this case hexagonal. The hexagon has an appropriate width across flats SW. Within the scope of the invention it would be entirely conceivable to provide an appropriate square, pentagon or octagon as the tool drive. In the explanations hereinafter, practical examples will also be discussed in which the tool drive is noncircular. Furthermore, within the scope of the invention it would be conceivable to provide a tool drive in the form of recesses and/or raised structures, such as radially aligned pegs or bores, and/or a symmetric or an asymmetric peripheral contour.

From FIG. 1 it is obvious that a multiplicity of options is available for the structural configuration of shoulder 6. For example, it is conceivable to make the shoulder cylindrical or even frustoconical, as illustrated in FIG. 1. It would also be possible to give the shoulder spherical-sector form, since only a shoulder projecting beyond portion 7 is needed in order that the head of the screw can be clamped securely in a tool. Head 2 can also have diverse configurations from the esthetic viewpoint. For example, it is advantageous for transitions or edges, especially those provided on the exposed end region of head 2, to be rounded. It is also possible for the circumferential termination at the outside rim of shoulder 6 to be hemispherical as viewed in cross section.

Viewed in the direction of longitudinal axis 11 of screw 1, portion 7 provided with tool drive 8 has a length B equal to or shorter than axial length A of shoulder 6 forming part of head 2. Axial length B of portion 7 provided with tool drive 8 can therefore be kept relatively short, and so the total height of head 2, which is determined by the sizes A+B, can accordingly be kept relatively small. Within the scope of the invention, however, it is also conceivable for portion 7 provided with tool drive 8 to have axial length B equal to or longer than axial length A of shoulder 6. Even in such a case the possibility exists of retaining the head of the screw in axially secure condition and creating a drive capability for a tool drive.

Figure 3:
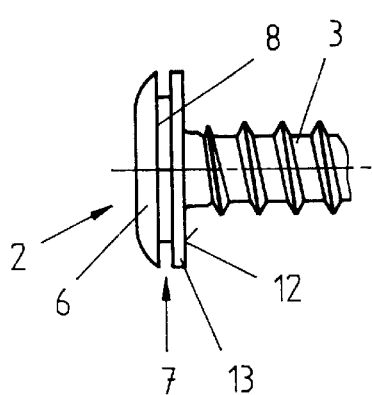
FIG. 3 to FIG. 5 show various alternative embodiments of heads for a screw.
Figure 4:
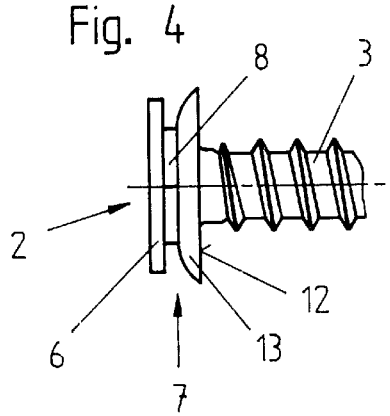

In the embodiments according to FIGS. 3 and 4 a disk-like part 13 forming bearing face 12 of screw head 2 adjoins portion 7 following shoulder 6. Portion 7 can be equipped in the same way with an appropriate tool drive 8, and shoulder 6 can be formed in the same way as in the embodiment in FIG. 1 or can even have appropriate cylindrical shape, as in the configuration according to FIG. 4. In the embodiment according to FIG. 3, the additional disk-like part has a substantially cylindrical shape, whereas in the embodiment according to FIG. 4 its configuration is similar to that of shoulder 6 according to FIGS. 1 and 3. In an embodiment according to FIG. 4, it is also conceivable for disk-like part 13 to have, for example, larger diameter than shoulder 6. Disk-like part 13 can be made in one piece with the head, or in other words with the entire screw, or can be made in the form of a washer, which is inserted noncaptively or captively under the screw head.

Shoulder 6 and additional disk-like part 13 can have the same or different size and/or outside contour, and so additional esthetic configuration options are also available here. It is also conceivable to dispose, instead of only one additional disk-like part 13 according to FIGS. 3 and 4, further such disk-like parts successively in axial direction, if necessary with portions of smaller diameter therebetween, so that two or more shoulders 6 spaced successively along the axis would be provided if necessary. An appropriate tool could then engage with two or more shoulders 6 from behind.

Figure 5:
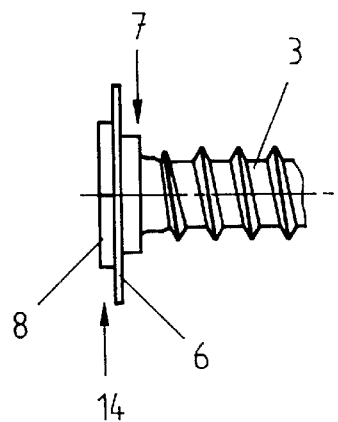

In the configuration according to FIG. 5, tool drive 8 is formed on a portion 14 of shoulder 6 remote from shank 3. In such a configuration, tool drive 8 is indeed more easily accessible for unauthorized loosening of the screw, but even in this case the axial length of tool drive 8 can be kept short if needed, to ensure that standard tools have hardly any room for proper engagement. A tool drive 8 with an external periperal drive is provided in portion 14, which in this case protrudes axially. In the case of a tool drive with an external drive, the most diverse shapes and contour geometries can be chosen, including noncircular structural variants or, for example, slots or regularly or irregularly running ridges; etc.

Even in such an embodiment it is entirely conceivable for both portion 14 and also portion 7 disposed under shoulder 6 to be provided with a tool drive. In the scope of the invention, therefore, a plurality of portions 7 and 14 disposed successively and if appropriate spaced apart in axial direction of screw 1 can be provided with a tool drive, and naturally the portion forming collar 6 can also be provided additionally with such a tool drive.

Figure 6:
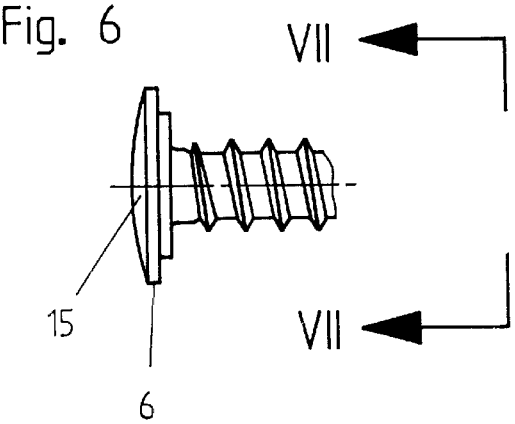
FIG. 6 shows a further alternative embodiment of the screw with a special head and FIG. 7 shows a section through line VII—VII in FIG. 6.
Figure 7:
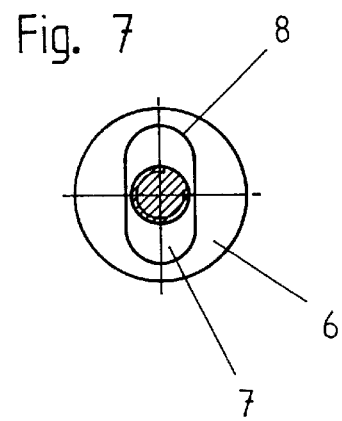

From the configuration according to FIGS. 6 and 7 it is evident that tool drive 8 on portion 7 disposed under shoulder 6 is noncircular. Naturally the most diverse configurations are understood as noncircular, for example a trilobular contour or any contour resembling an orbiform curve. It is also possible, however, to provide an ellipsoidal tool drive 8 or, as illustrated in the FIG. 7, a kind of elongated ridge with parallel boundary faces, wherein the ends of the ridge are circularly rounded. Precisely from the embodiment according to FIGS. 6 and 7 it can be further inferred that the termination of head 2 of the screw, or for practical purposes in this case the upper side of shoulder 6, forms a termination 15 of spherical-sector form.

Figure 8:
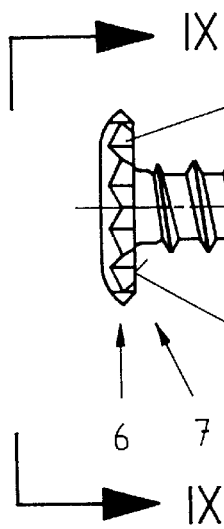
FIG. 8 shows a view of a further embodiment of a screw.
Figure 9:
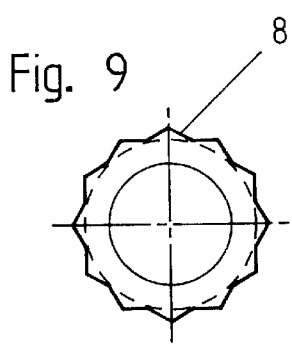
FIG. 9 shows the view IX—IX according to FIG. 8.

As already explained, a tool drive could also be formed on the shoulder itself. In the configuration according to FIGS. 8 and 9, tool drive 8 is for practical purposes provided at the transition of shoulder 6 to portion 7 disposed thereunder, so that tool drive 8 not only serves as the drive for the driving tool but in addition performs the function assigned to shoulder 6, in that a tool can engage with it from behind. Tool drive 8 extends for practical purposes from bearing face 12 of head 2 to the peripheral contour of shoulder 6. In this configuration a direct drive capability is indeed available once again after the screw has been set, but the drive faces in this case also are of short axial extent, and so an appropriate torque can hardly be transmitted without additional clamping of the head.

Within the scope of the invention, it would be further conceivable to equip the shoulder with an appropriate external drive and, in order to establish an appropriate axial distance between the shoulder and the workpiece after the screw has been finally set, simply to insert a washer with diameter smaller than that of the shoulder. This smaller washer can be mounted noncaptively or captively by simple means on shank 3 of screw 1. Thus the possibility is created of being able to engage appropriately with shoulder 6 from behind, in addition to which the appropriate torque can also be transmitted when head 2 is seized, because the tool seizing the shoulder simultaneously engages in the external drive on the shoulder itself. On the whole, however, the washer could also have a diameter which is equal to or larger than the diameter of shoulder 6, although this washer is then provided with an annular extension of smaller diameter, on which the head of the screw is braced. In this way the axial space necessary for engaging with the shoulder from behind is again obtained.

Since optimum retention and alignment of a screw can be achieved during the driving-in process, the structural expedients according to the present invention can naturally be used even for screws whose heads are coated with plastic, for example, or largely comprise a plastic mass. Because the head of the screw is clamped, the danger of stripping in the region of the tool drive is also substantially reduced, and so even screw heads made of plastic can be appropriately shaped and operated in this way without problem. Thus it would also be conceivable in principle to make self-boring screws even if the heads thereof were plastic-coated or comprised plastic almost throughout.

The material of the screws in which the expedients according to the invention will be used is inherently of no consequence. Thus it is possible, in the manner according to the invention, to manufacture screws of carbon steel, stainless steel, aluminum or other materials, or even screws made completely of plastics or glass-fiber-reinforced plastics.

What is claimed is:

1. A screw comprising a shank having a thread at least on a portion thereof, and a head including a bearing face and at least one shoulder spaced apart by an other portion an axial distance from the bearing face, the shoulder being formed as an integral unit with the shank and extending at least in portions thereof radially beyond the other portion, the other portion being formed to include an external drive surface to form a first tool drive means, for lateral engagement by a first tool and a second tool drive means for lateral engagement by a second tool being formed on a side of the shoulder opposite to the shank.

2. A screw according to claim 1, wherein the other portion adjoining the shoulder on the shank side adjoins a disk-shaped part that forms the bearing face.

3. A screw according to claim 2, wherein the disk-shaped part is constructed as one-piece with the head or is a washer.

4. A screw according to claim 2, wherein the shoulder and the disk-shaped part have at least one of a different size or outside contour.

5. A screw according to claim 1, wherein the second tool drive means comprises an axially protruding portion.

6. A screw according to claim 1, wherein a washer having a smaller diameter than the shoulder is located on the shank to create an axial offset, the washer being captively or non-captively held under the shoulder.

7. A screw according to claim 1, wherein the shoulder completely masks the other portion that includes the first tool drive means when viewed axially, so that the first tool drive means is located within the outside boundary of the head.

8. A screw according to claim 1, wherein the first tool drive means has a polygonal or non-circular cross-section.

9. A screw according to claim 1, wherein the first tool drive means is comprised of at least one of recesses, raised structures, an asymmetric peripheral contour, and a symmetric peripheral contour.

10. A screw according to claim 1, wherein the shoulder has a cylindrical, frustoconical or spherical sector form.

11. A screw according to claim 1, wherein the head includes an exposed region having at least one of transitions or edges, and the transitions or edges of the head are rounded.

12. A screw according to claim 1, wherein the axial length of the other portion provided with the first tool drive means is less than or equal to an axial length of the shoulder.

13. A screw according to claim 1, wherein the axial length of the other portion provided with the first tool drive means is longer than an axial length of the shoulder.

14. A screw according to claim 1, wherein a boring part is located on the end of the shank opposite to the head.

15. The screw according to claim 1, wherein the other portion is free of laterally confining structure and is therefore adapted for unimpeded lateral engagement of said external drive surface by a drive tool.

16. The screw according to claim 1, wherein the other portion is free of laterally confining structure which impedes the free lateral access by a drive tool to said external drive surface.

* * * * *